(No Model.)
S. SHIVE.
BELT SHIFTER AND TIGHTENER.
No. 388,729. Patented Aug. 28, 1888.
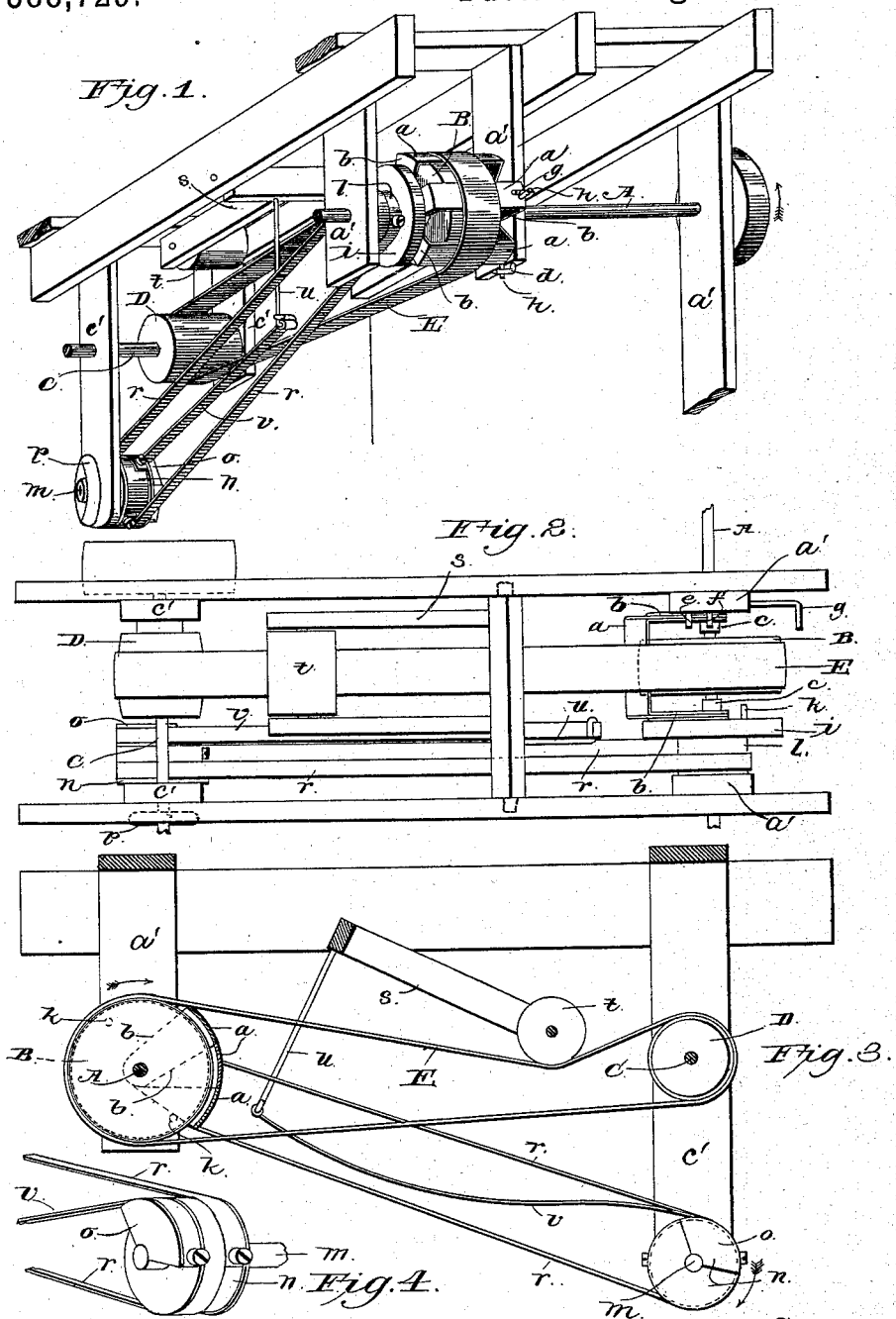
Witnesses
M. Fowler
C. G. Siggers
Inventor,
Samuel Shive,
By his Attorneys
C. A. Knowles

UNITED STATES PATENT OFFICE.

SAMUEL SHIVE, OF FORKS, PENNSYLVANIA.

BELT SHIFTER AND TIGHTENER.

SPECIFICATION forming part of Letters Patent No. 388,729, dated August 28, 1888.

Application filed November 17, 1887. Serial No. 255,436. (No model.)

*To all whom it may concern:*

Be it known that I, SAMUEL SHIVE, a citizen of the United States, residing at Forks, in the county of Columbia and State of Pennsylvania, have invented a new and useful Improvement in Belt Shifters and Tighteners, of which the following is a specification.

My invention relates to an improvement in belt shifters and tighteners; and it consists in the peculiar combination and arrangement of devices, that will be more fully set forth hereinafter, and particularly pointed out in the claims.

In the accompanying drawings, Figure 1 is a perspective view showing my improved belt shifter and tightener in position adapted for use. Fig. 2 is a top plan view of the same, showing the guard-plates in another position. Fig. 3 is a vertical section view of the belt-shifter. Fig. 4 is a detail view of the drum, its segmental offset, and the belt and strip connected thereto.

A represents a driving-shaft, provided with a pulley, B, and C represents a counter-shaft, having a pulley, D, which is connected to the pulley B by means of an endless belt, E. The shaft A is journaled in suitable hangers, $a'$, and the shaft C is journaled in suitable hangers, $b'$, which, as has been shown, are attached to the rafters $c'$ of a workshop; but any suitable bearings for the shafts may be employed, according to the necessities of the case. The object of my invention is to provide means whereby the said belt may be shifted from the pulley B, and thereby permit the counter-shaft C to remain stationary while the shaft A continues to rotate. This is commonly done by providing the shaft A with a loose pulley arranged alongside the pulley B, and a lever to shift the belt E sidewise from the pulley B onto the loose pulley. Such a contrivance is objectionable for the reason that the loose pulley requires constant attention to keep it properly lubricated, and is apt to get loose and to rattle, and is further objectionable for the reason that the sidewise shifting of the belt causes the latter to wear. It is further objectionable for the reason that the belt is constantly running and wearing (with the same tightness) while the counter-shaft is at rest.

In order to accomplish my object I have provided a mechanism hereinafter described.

$a$ represents a series of guard-plates, which have their ends bent inward at right angles to form arms $b$, which arms have their inner ends pivoted or hinged on sleeves $c$, that are secured on the shaft A on opposite sides of the pulley B. The said guard-plates are of slightly different lengths, so that their arms $b$ are arranged one within another, and thereby the said guard-plates are adapted to be swung to the inner side of the pulley B and closed together, as shown at Figs. 2 and 3, or swung outward around the opposite side of the said pulley and spread apart, as shown in Fig. 1. One of the hangers in which the shaft A is journaled is provided at its lower end with a stop-pin, $d$, has at a suitable distance above the shaft a pair of stop-pins, $e f$, and is provided on its rear side with a projecting stop-pin, $g$. Two of the guard-plates $a$ are provided with projecting stop-pins $h$.

$i$ represents a disk, which is journaled loosely on the shaft A on one side of the pulley B, and is provided on its inner side with a pair of stop-pins, $k$, arranged a suitable distance apart. On the outer side of the said disk is a drum, $l$, which is also loose on the shaft A, and is connected to the disk $i$.

$m$ represents a shaft, which is journaled in a suitable bearing at a point below the shaft C, and is provided at one end with a drum, $n$, having a segmental offset, $o$, on one side; and to the outer end of the shaft $m$ is secured a hand-wheel, $p$, by means of which the said shaft $m$ may be turned. The offset $n$ is segmental in shape in order to reduce the weight thereof and to economize material; but said offset may be circular or polygonal, if preferred.

$r$ represents a pair of straps, which have their ends partly coiled on the drums $l$ and $n$, and serve to connect the said drums together.

$s$ represents a frame, which has one end pivoted in suitable supports above the upper sides of the belt E, and is provided at its free end with a tightening pulley or roller, $t$, which is adapted to bear upon the slack side of the belt. From the lower side of the frame $s$, at the pivoted end of the same, depends a lever-arm, $u$, which is connected to the segment $o$ by means of a strap, $v$.

The operation of my invention is as follows: The shaft A rotates in the direction indicated by the arrow. When it is desired to impart motion to the shaft C, the operator turns the shaft $m$ in the direction opposite that indicated by the arrow, and thereby causes the straps $r$ to turn the disk $i$ also in an opposite direction on the shaft A, and one of the stop-pins on the said disk strikes against the upper of the series of guard-plates, and thereby swings the said guard-plate on the shaft A from the upper side of the periphery of the pulley B, so that the belt E rests upon the said pulley and serves to communicate its motion to the pulley on shaft C. This retrograde rotation of the shaft $m$, besides causing the guard-plates to be moved from between the belt and the pulley B, also causes the strap $v$ to be relaxed, so that the frame $s$ is caused to descend and permit its pulley $t$ to bear upon the upper side of the belt E, and thereby tighten the latter and prevent it from slipping on the pulleys B D. If it is desired to disconnect the shafts A C, the operator turns the shaft $m$ in the direction indicated by the arrow, and thereby causes one of the stop-pins on the disk $i$ to strike against the inner guard-plate, and thereby swing the guard-plates upward on the shaft A, so that they will be caused to pass between the opposing sides of the periphery of the roller B and the belt E, and thereby release the said belt from contact with the pulley. The momentum of the belt when it is first engaged by the guard-plates will be sufficient to swing the said guard-plates to a position indicated in solid lines in Fig. 3, with their stop-pins in engagement with the stop-pins $d$ and $g$ of the hanger and the upper guard-plate in engagement with the stop-pin $e$. The same movement of the shaft $m$ which causes the guard-plates to disengage the belt from the pulley B also causes the segment $o$ to draw upon the strap $v$ and cause the free end of the frame $s$ to rise and thereby release the pressure of the pulley $t$ from the slack side of the belt.

Having thus described my invention, I claim—

1. The combination, in a belt-shifter, of the pulley B, the belt E, the guard-plates having the arms hinged or pivoted to the axis of the pulley, and the revoluble disk loose on the same shaft with pulley B, and having the stops to swing the guard-plates around the pulley, and thereby cause the same to pass between the pulley and the belt and release the latter therefrom, substantially as described.

2. The combination of the shaft A, having the pulley B, the counter-shaft C, having the pulley D, the endless belt connecting the pulleys B and D, the guard-plates having the arms pivoted to the shaft A, the disk journaled on shaft A, adapted to engage and operate the guard-plates, the pivoted frame having the pulley or roller adapted to bear upon the belt to tighten the same, the shaft $m$, and connecting-straps between the same and the disk and the frame $s$, whereby the said disk may be caused to interpose the guard-plates between the pulley D and the belt and simultaneously cause the frame $s$ to raise the pulley or roller from the belt, substantially as described.

3. The combination, in a belt-shifter, of the pulley B, the belt E, the guard-plates having the arms pivoted to the axis of the pulley and adapted to be swung thereon, for the purpose set forth, and the stops to retain the guard-plates in position, substantially as described.

In testimony that I claim the foregoing as my own I have hereto affixed my signature in presence of two witnesses.

SAMUEL SHIVE.

Witnesses:
W. C. DOUGHERTY,
SAM C. BROWN.